(12) United States Patent
Yang et al.

(10) Patent No.: US 7,330,462 B2
(45) Date of Patent: Feb. 12, 2008

(54) MANAGING WIRELESS PACKET SERVICE RESOURCES

(75) Inventors: ZhongJin Yang, Naperville, IL (US); Jie Yao, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1014 days.

(21) Appl. No.: 10/397,659

(22) Filed: Mar. 26, 2003

(65) Prior Publication Data

US 2004/0190493 A1    Sep. 30, 2004

(51) Int. Cl.
  *H04Q 7/00*   (2006.01)
  *H04Q 7/20*   (2006.01)
  *H04Q 7/24*   (2006.01)

(52) U.S. Cl. ............ 370/352; 370/329; 370/338; 455/445; 455/450

(58) Field of Classification Search ........ 370/229–260, 370/331–352, 437–517; 455/445–450, 509–519
See application file for complete search history.

(56) References Cited

U.S. PATENT DOCUMENTS

| | | | |
|---|---|---|---|
| 6,188,892 B1 * | 2/2001 | Krishnamurthi et al. | 455/422.1 |
| 6,477,150 B1 * | 11/2002 | Maggenti et al. | 370/312 |
| 6,654,360 B1 * | 11/2003 | Abrol | 370/329 |
| 6,707,809 B1 * | 3/2004 | Warrier et al. | 370/351 |
| 6,912,214 B2 * | 6/2005 | Madour et al. | 370/340 |
| 2001/0023186 A1 * | 9/2001 | Krishnamurthi et al. | 455/450 |
| 2003/0232629 A1 * | 12/2003 | Jang et al. | 455/552.1 |
| 2004/0022212 A1 * | 2/2004 | Chowdhury et al. | 370/329 |
| 2004/0105400 A1 * | 6/2004 | Jean | 370/311 |
| 2005/0009515 A1 * | 1/2005 | Inoko | 455/426.2 |
| 2005/0073969 A1 * | 4/2005 | Hart et al. | 370/318 |
| 2005/0195787 A1 * | 9/2005 | Madour et al. | 370/338 |
| 2006/0246923 A1 * | 11/2006 | Krishnamurthi et al. | 455/458 |

* cited by examiner

Primary Examiner—Man U. Phan

(57) ABSTRACT

In a packet switch for communicating packet switched data to and from a plurality of wireless mobile stations, a method and apparatus for automatically releasing resources tied up for communicating with dormant mobile stations. If the station has been dormant for a sufficiently long time, an alerting message is sent to the user of that mobile station. The user can then respond by requesting a release of the packet switched data (PSD) call currently connected to that mobile station or can request that the connection remain up. Advantageously, if the user of the station does not respond, then following a timeout the PSD call is released and the resources required for keeping the dormant call in existence are made available for new calls.

10 Claims, 2 Drawing Sheets

MANAGING WIRELESS PACKET SERVICE RESOURCES

TECHNICAL FIELD

Figure 1:
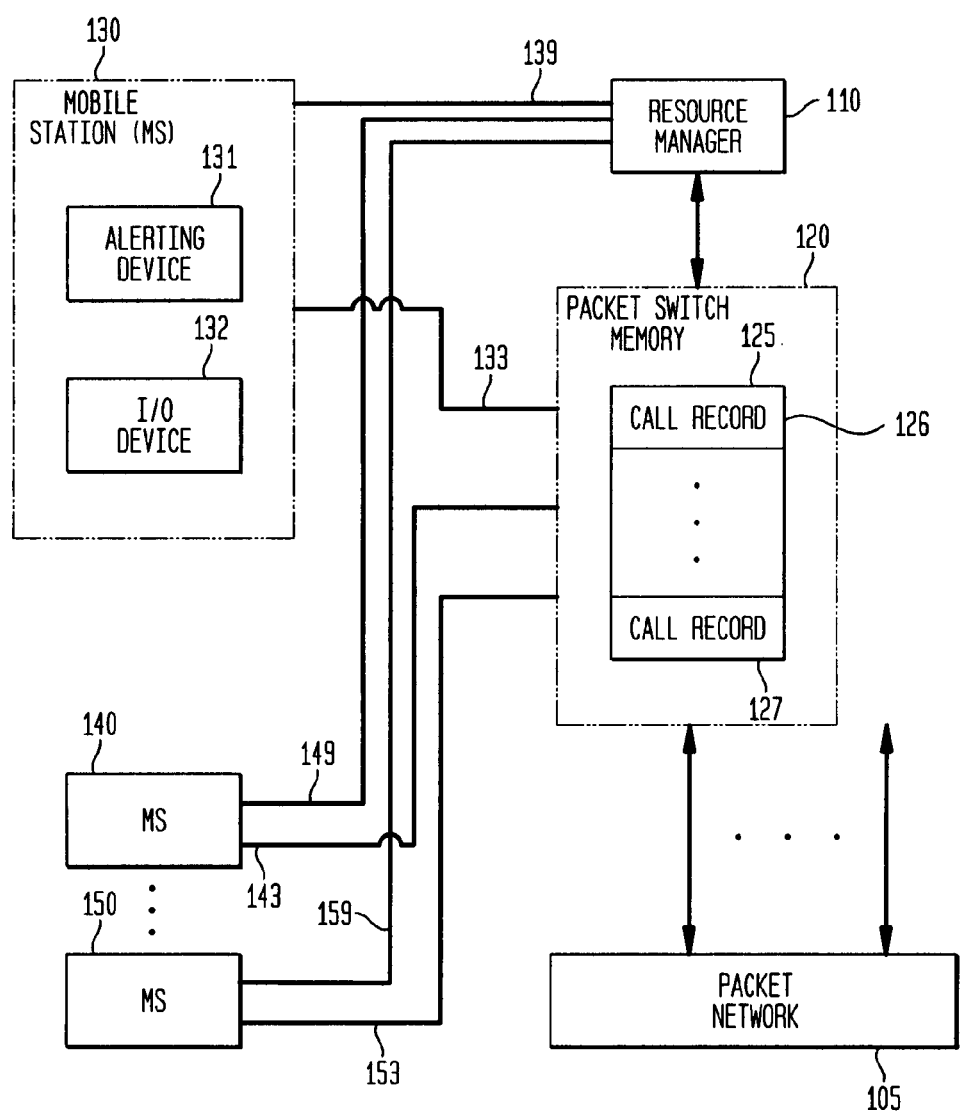

This invention relates to the management of wireless packet service resources and, more specifically, to arrangements for automatically disconnecting end users who appear to be idle.

BACKGROUND OF THE INVENTION

The use of wireless transmission for data has sharply increased in the past decade and is likely to further increase in the coming decade. The most common form of transmission of such data is as packetized data wherein packets are transmitted as needed in contrast to circuit switched data in which a circuit is held for the duration of a call whether or not data is actually being transmitted.

It is characteristic of data transmission that such transmission is frequently sporadic, i.e., that there are intervals in which data is being transmitted and long intervals in which no data is being transmitted but a circuit is maintained because there is a possibility that data will be transmitted shortly. While a packet system does not use transmission resources when no data is being transmitted, such a system still requires the allocation of resources in the packet switch serving a mobile station whether the call is in an active transmitting state or in a dormant state. For example, even when the call is in the dormant state an Internet Protocol (IP) address must be retained by the packet switch along with other information about the destination or source mobile station even when the call is in the dormant state so that the transmission resources can be assigned to the call when the call goes from the dormant state to an active transmission and/or reception state.

A problem of the prior art therefore is that packet network switching resources are retained for packet data calls in wireless systems even when the call in a dormant state and unlikely to emerge from that state.

SUMMARY OF THE INVENTION

Applicants have studied this problem and have concluded that there are two major causes that can result in a dormant call unnecessarily tying up resources in a packet switch. The data caller may forget to release a call in which case the dormant call stays in the system until such a time as the user recognizes that he/she has failed to release the call or that such a user either originates or receives a new call. Another possibility is that the packet switch did not receive the releasing instruction because of a failure in the network. This is undesirable since packet switches usually have limited Internet access resources, for example, a limited number of Internet Protocol (IP) addresses for serving packet mobile stations.

Applicants have solved this problem and have made an advance over the teachings of the prior art in accordance with this invention wherein a packet switch sends an alerting signal to a mobile station connected on a long time dormant packet switched data (PSD) call; if, in response to receipt of the alerting signal, the mobile station transmits a maintain request, then the PSD call is maintained; if the mobile station wishes to disconnect then the PSD call is disconnected; if neither response is received by the packet switch then upon the lapse of a timeout interval, the call will be released.

A number of variables can be used to control this process. First, the activity of the packet switch can be monitored and this process initiated when the packet switch has a sufficiently high level of traffic and/or a sufficiently large number of packet switched data calls. Second, the length of time of the timer can be adjusted so that when the traffic is very high and/or the number of PSD calls is high, then the timeout time can be reduced. Third, the criterion for the timeout can be a function of the class of service of the mobile station and/or the type of call.

Advantageously, this arrangement can be used to clear non-productive PSD calls from busy packet switches.

In accordance with one embodiment of Applicants' invention, a separate resource manager is used for controlling the process described above. Advantageously, a separate (or logically separate) resource manager can readily act upon more sources of information, such as the class of service of the mobile station and the traffic of several switches.

BRIEF DESCRIPTION OF THE DRAWING(S)

Figure 2:
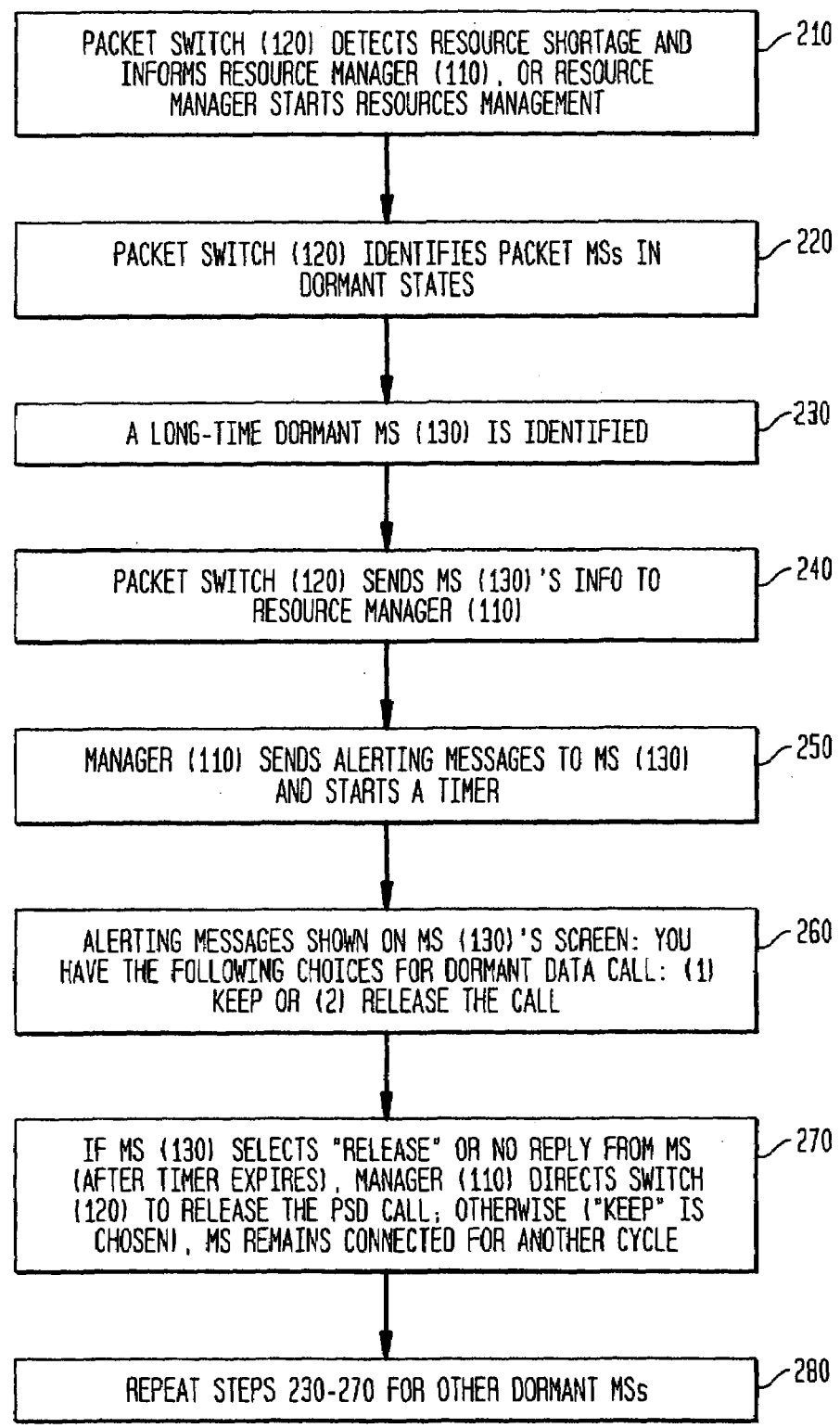

FIG. 1 illustrates a network and a plurality of mobile stations for receiving and transmitting PSD calls; and FIG. 2 is a flow diagram illustrating the process of detecting long-term dormant calls which can be released.

DETAILED DESCRIPTION

FIG. 1 is a block diagram illustrating a system on which Applicants' invention can be practiced. A plurality of mobile stations 130, 140, . . . , 150 is connected to a packet switch 120. The packet switch is a switch capable of transmitting packets to the mobile stations and receiving packets from these stations. The packet switch is connected to the mobile stations via channels shown as 133, 143, . . . , 153 each of which includes a final segment that is wireless. Intermediate base stations for serving the mobile stations, well known in the cellular systems art, are not shown. The packet switch 120 is connected to a packet network 105 for accessing other packet switches and their connected mobile or landline stations. The packet switch contains a block of memory 125 that has a plurality of call records 126, . . . , 127. Each call record is associated with an IP address. The IP addresses are limited resources; when all IP addresses are assigned, no new caller can be served even though the switch may still have a lot of unused transportation facility resources because too many dormant callers are occupying the IP addresses. The call records contain records of the address of the mobile station involved in the call and the address of the circuit for accessing the packet network to complete the call.

The resource manager 110 communicates directly with a mobile switch by a virtual channel 139, 149, 159 routed through the packet switch 120. Each mobile station contains an I/O device such as I/O device 132 in mobile station 130. The I/O device typically is a keyboard and a monitor. In addition, the mobile station contains an alerting device 131 for generating a tone or ringing signal to alert a user that an incoming call has been detected or to otherwise alert the user in the middle of a call of other conditions.

The packet switch 120 or, alternatively, a resource manager 110 communicating with packet switch 120, examines call records for calls in the system to detect dormant calls that are candidates for automatic release in accordance with the method shown in FIG. 2. When a candidate has been identified the packet switch 120 sends an alerting signal and/or alerting message to the mobile station on the call that is the candidate for release in an attempt to elicit a message allowing the release or requesting that the call not be released in order to avoid having to perform a release automatically based on a timeout. A resource manager 110 can either be a software package within the packet switch 120 or a separate processor communicating with packet switch 120. If a resource manager is used, this resource manager keeps track of PSD calls in the system in order to detect candidates for requested and/or automatic release.

FIG. 2 is a flow diagram illustrating the operation of Applicants' invention. Packet switch 120 detects a resource shortage and informs resource manager 110 (action block 210). Alternatively, the resource manager initiates the process of managing data resources such as Internet Protocol (IP) resources. The resource shortage can be detected simply by the count of the number of IP connections from packet switch 120. Alternatively, the actions started by action block 210 can be performed periodically even if no resource shortage exists.

Packet switch 120 identifies packet main stations in dormant states (action block 220). A packet main station is in a dormant state if it has not received or transmitted any packets for a pre-specified time. This pre-specified time can be a function of the type of service provided to that packet mobile station.

A long time dormant main station such as mobile station 130 is identified (action block 230). The long time dormant mobile station is identified because this station has not received or transmitted any packets under the test of action block 220.

Packet switch 120 sends mobile station 130's information to the resource manager 110 (action block 240). The resource manager 110 can be a software package within packet switch 120 or it can be a separate processor.

The manager 110 sends alerting messages to a mobile station such as mobile station 130 that has been identified as a long-term dormant mobile station; manager 110 starts a timer for that mobile station (action block 250). The alerting messages are sent via packet switch 120.

The alerting messages are shown on the screen of the mobile station identified as a long time dormant mobile station. An alerting message would indicate to the mobile station that it should either keep or release the call (action block 260). In addition, optionally, depending on the type of mobile station, an alerting tone can also be transmitted to the long time dormant mobile station.

If the mobile station selects release or no reply is received and the timer expires, then manager 110 directs switch 120 to release the PSD call. Otherwise, "keep" is chosen and the mobile station remains in the dormant state for another cycle unless it starts to receive or transmit data in which case the mobile station becomes active (action block 270). The steps 230-270 are then repeated for other dormant mobile stations (action block 280). As a result of the actions performed in action blocks 210-280, long time dormant stations have their PSD calls released and the resources associated with such calls are made available for new calls.

The above description is of one preferred embodiment of Applicants' invention. Other embodiments will be apparent to those of ordinary skill in the art without departing from the scope of the invention. The invention is limited only by the attached claims.

We claim:

1. In a packet switching network, a method of releasing long-term dormant calls comprising the steps of:

detecting, in said packet switching network, packet switched data (PSD) calls for which no packets have been transmitted for a predetermined period of time;

sending an alerting message to a mobile station connected on one of said calls;

responsive to a request to release said call, releasing said call;

responsive to absence of a response from said mobile station, releasing said call, prior to performing said detecting step, determining whether a shortage of resources exists in a switch serving said long-term dormant calls; and if it is determined that a shortage of resources exist, performing said detecting.

2. The method of claim 1 wherein said predetermined period of time is a function of a class of service of said mobile station.

3. The method of claim 1 wherein responsive to a request from said station for continuing said call, said call is continued.

4. The method of claim 1 further comprising the step of performing the detecting periodically.

5. In a packet switching network, a method of releasing long-term dormant calls comprising the steps of:

detecting, in said packet switching network, packet switched data (PSD) calls for which no packets have been transmitted for a predetermined period of time;

sending an alerting message to a mobile station connected on one of said calls;

responsive to a request to release said call, releasing said call;

responsive to absence of a response from said mobile station, releasing said call, wherein the step of releasing said call responsive to absence of a response from said mobile station comprises the step of:

timing for another predetermined period of time to see if a response is received from said mobile station; and if no response is received from said mobile station within said another predetermined period of time, releasing said call.

6. In a packet switching network, apparatus for releasing long-term dormant calls, comprising:

means, in said packet switching network, for detecting packet switched data (PSD) calls for which no packets have been transmitted for a predetermined period of time;

means for sending an alerting message to a mobile station connected on one of said calls;

means, responsive to a request to release said call, for releasing said call;

means, responsive to absence of a response from said mobile station, for releasing said call, further comprising:

means for determining whether a shortage of resources exists in a switch serving said long-term dormant calls; and if it is determined that a shortage of resources exist, means for initiating performance of the detecting step, and a resulting sending step and releasing steps.

7. The apparatus of claim 6 wherein said predetermined period of time is a function of a class of service of said mobile station.

8. The apparatus of claim 6 wherein responsive to a request from said station for continuing said call, said call is continued.

9. The apparatus of claim 6 further comprising means for periodically initiating the steps of claim 6.

10. In a packet switching network, apparatus for releasing long-term dormant calls, comprising:

means, in said packet switching network, for detecting packet switched data (PSD) calls for which no packets have been transmitted for a predetermined period of time;

means for sending an alerting message to a mobile station connected on one of said calls;

means, responsive to a request to release said call, for releasing said call;

means, responsive to absence of a response from said mobile station, for releasing said call, wherein the means for releasing said call responsive to absence of a response from said mobile station comprises:

means for timing for another predetermined period of time to see if a response is received from said mobile station; and if no response is received from said mobile station within said another predetermined period of time, means for releasing said call.

* * * * *